United States Patent [19]
Campbell, III

[11] Patent Number: 5,137,138
[45] Date of Patent: Aug. 11, 1992

[54] METHODS AND APPARATUS FOR CHAIN LENGTH ADJUSTMENT

[75] Inventor: William A. Campbell, III, Athens, Ga.

[73] Assignee: Campbell-Hardage, Inc., Athens, Ga.

[21] Appl. No.: 645,235

[22] Filed: Jan. 24, 1991

[51] Int. Cl.5 .............................................. B65G 47/26
[52] U.S. Cl. .................. 198/419.3; 198/792
[58] Field of Search ............................ 198/419.3, 792

[56] References Cited

U.S. PATENT DOCUMENTS

| 2,142,003 | 12/1937 | Morgelin | 198/792 X |
| 2,961,020 | 11/1960 | Minami | 198/792 |
| 3,462,002 | 7/1967 | Zuppiger | 198/792 |
| 3,516,363 | 1/1968 | Van Der Wal | 198/792 |
| 3,565,238 | 2/1971 | Candela | 198/792 |
| 4,098,392 | 7/1978 | Greene | 198/419.3 |
| 4,227,606 | 10/1980 | Bogatzki | 198/792 X |
| 4,611,705 | 9/1986 | Fluck | 198/419.3 X |
| 4,660,350 | 4/1987 | Hogenkamp | 198/419.3 |

FOREIGN PATENT DOCUMENTS 1061273 8/1979 Canada .
736827 4/1953 United Kingdom .

Primary Examiner—Robert P. Olszewski
Assistant Examiner—Cheryl L. Gastineau
Attorney, Agent, or Firm—Jones, Askew & Lunsford

[57] ABSTRACT

An apparatus for adjusting the length of a chain path having cookie or cracker divider assemblies attached thereto. A continuous series of edge-stacked cookies or crackers may be divided into groups by the divider assemblies. Adjustment of slide bars in the path of the roller chain allow for adjustment of the length of chain intermediate the slide bars. Also provided is an articulating finger configured to work in cooperation with a vibrating chute.

18 Claims, 6 Drawing Sheets

METHODS AND APPARATUS FOR CHAIN LENGTH ADJUSTMENT

TECHNICAL FIELD

This invention relates in general to food handling, including cookie and cracker handling. More particularly, this invention relates to a method and apparatus for manipulating a roller chain section, in order to provide relative spacing of food guiding fingers extending from the chain. These fingers are used to divide and define "slugs" of cookies or crackers for further processing, in a manner previously not provided by known prior art methods or apparatuses.

BACKGROUND OF THE INVENTION

In the field of cookie or cracker handling, it is known to assemble a plurality of substantially flat cookies or crackers, and to manipulate such food materials until they are stacked on one edge with a substantial part of their planar surfaces in contact. Such configurations are typically referred to as being "shingle stacked".

After such stacking, it is often preferable to subdivide the cookies or crackers into spaced-apart groups commonly referred to as "slugs". These slugs may then be subsequently packaged, individually or in sets, for subsequent delivery to consumers. It may be appreciated that it is highly desirable for the slugs to be uniform in volume and/or weight, in order that packaging regulations may be met without overpacking the slug containers.

Prior art methods and apparatuses are known for providing slugs. U.S. Pat. No. 4,098,392 to Greene, entitled "Potato Chips Processing Machine", discloses a process of inserting juxtaposed separator blades into a line of potato chips as the blades move along with the line of potato chips. After the juxtaposed blades are inserted into the line of chips, the blades are separated. However, a relatively complex configuration is utilized in order to adjust the relative positioning of the blades.

It is also known to provide chain loops which may, due to their configuration, be manipulated to run at slower or faster rates along their respective paths. For example, U.S. Pat. No. 2,142,003 to Morgelin, entitled "Conveyor Chain", discloses a conveyor chain which runs at two different speeds, due to an eccentric configuration which allows the chain links to intermittently shortened and lengthened. U.S. Pat. No. 3,462,002 to Zuppiger, entitled "Varying-Pitch Chain-Like Arrangement to Drive Loads at Variable Speed", discloses configurations utilizing various pulleys, shackles, and links cooperating with a "guide means 15", with the guide means having progressively varying thicknesses, being thin in the region of link "A", and thicker in the region the region of link "D", in reference to FIG. 1. Depending on the thickness of the guide means, the chain-like assembly passes along the track at different speeds.

U.S. Pat. No. 3,516,363 to Van Der Wal, entitled "Conveyor System with Portions Operable at Different Speeds", discloses a conveyor system having portions operable at different speeds, by virtue of the positioning of interconnecting linkages. Rollers 34 bias against members 36, 37, such that linkages in the conveyor system are provided at an incline. U.S. Pat. No. 4,227,606 to Bogatzki, entitled "Apparatus for Spacing Articles Moving in a Line", discloses the use of two tracks each guiding rollers rotatably mounted approximate the ends of interconnecting linkage members, with the tracks being adjustable relative to each other.

Canadian Patent No. 1,061,273 to Yamato, entitled "Device for Transporting Materials" discloses manipulation of a chain supporting a plurality of buckets such that the chain is in a serpentine configuration along a portion of its path. U.K. Patent No. 736,827 to Carvell entitled "Improvements in or Relating to Conveyor or Transmission Systems" discloses a chain which may be altered to a "zig-zag" configuration with the assistance of rollers such as 126 shown in FIG. 8.

Although the above disclosures do contemplate advantageous apparatuses in their own right, a need nevertheless still exists for a simple, efficient, effective means for adjusting the spaced-apart positions of pins along the length of a chain. A need also exists for a method and apparatus for uniformly separating slugs of cookies or crackers from a continuous series of edge-stacked series of the same. Finally, a need exists for subdividing a series of an edge-stacked series of cookies or crackers with minimal damage to the same.

SUMMARY OF THE INVENTION

The present invention overcomes the above-discussed disadvantages in the prior art by providing a plurality of separating assemblies on a continuous chain, with the chain being driven such that fingers of the separating assemblies may intersect the path of a series of edge-stacked cookies or crackers. An adjustability feature of the chain allows for selective adjustment of the distance of the finger separation when the fingers intersect the path of the cookies or crackers.

The present invention also overcomes deficiencies in the prior art by providing an articulating movement to the fingers to allow them to move articulate upwardly relative to a supporting base block, to allow the finger to find its way to either side of an interfering cookie or cracker with the assistance of a vibrating conveyor through which the cookies or crackers are passing.

Thus, it is an object of the present invention to provide an improved method and apparatus for handling food products.

It is a further object of the present invention to provide a method and apparatus for subdividing a continuous series of edge-stacked cookies or crackers.

It is a further object of the present invention to provide a method and apparatus for subdividing a series of edge-stacked cookies or crackers with minimal damage to the same.

It is a further object of the present invention to provide an adjustable means for subdividing different slug lengths of cookies or crackers.

It is a further object of the present invention to provide a means for providing substantially uniform slug lengths of cookies or crackers.

It is a further object of the present invention to provide a means for providing substantially uniform slug lengths of cookies or crackers with minimal damage to the same.

Other objects, features, and advantages of the present invention will become apparent upon reading the following detailed description of the preferred embodiment of the invention when taken in conjunction with the drawings and the appended claims.

DETAILED DESCRIPTION OF THE PREFERRED EMBODIMENT

General Operation

Figure 1:
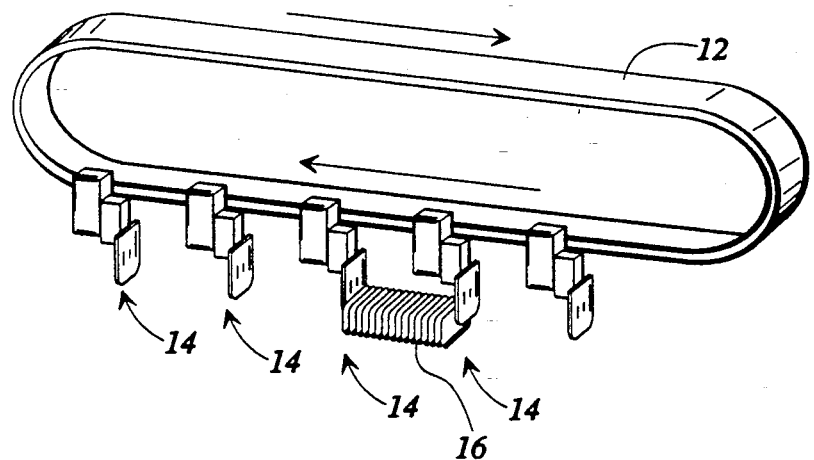
FIG. 1 is a simplified view of a loop of chain 12, having a plurality of spaced-apart divider assemblies attached thereon. Between one pair of divider assemblies is shown a "slug" of crackers being drawn along a path. Not all divider assemblies are shown on the chain loop.

Referring now to the drawings, in which like numerals represent like parts through the several views, FIG. 1 shows a chain 12 configured to travel about a substantially loop-like path. A plurality of divider assemblies 14 are attached about the chain 12 path at spaced-apart intervals thereon. The divider assemblies 14 intersect a path along which cookies or crackers travel within a vibrating trough shown as 13 in FIG. 2, which is vibrated by a plurality of vibrators, one of which is shown as 15. A "slug" of cookies or crackers are shown between a pair of divider assemblies at 16. For purposes of the remainder of this description, "crackers" will only be discussed as the foods being processed. However, it should be understood that other elements including but not limited to cookies could be subdivided without departing from the spirit and scope of the present invention.

Figure 2:
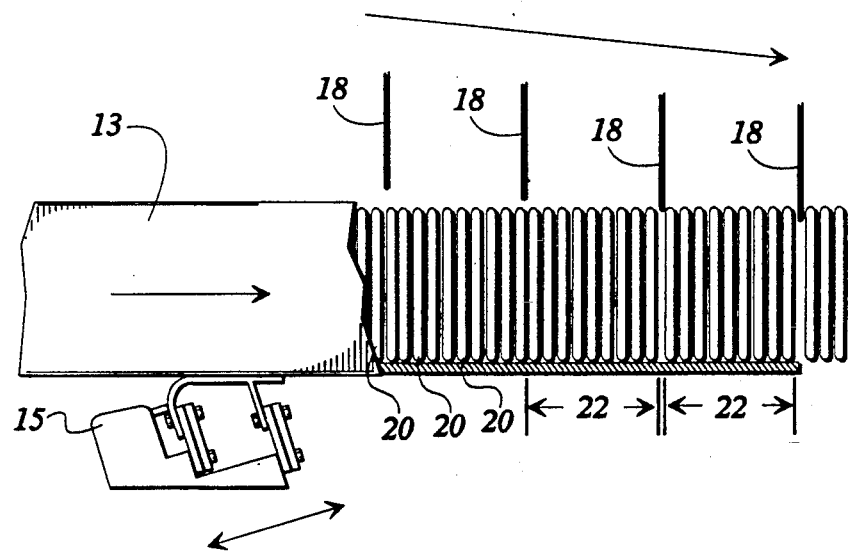
FIG. 2 is a side illustrative view showing a plurality of edge-stacked crackers being divided by fingers.
Figure 3:
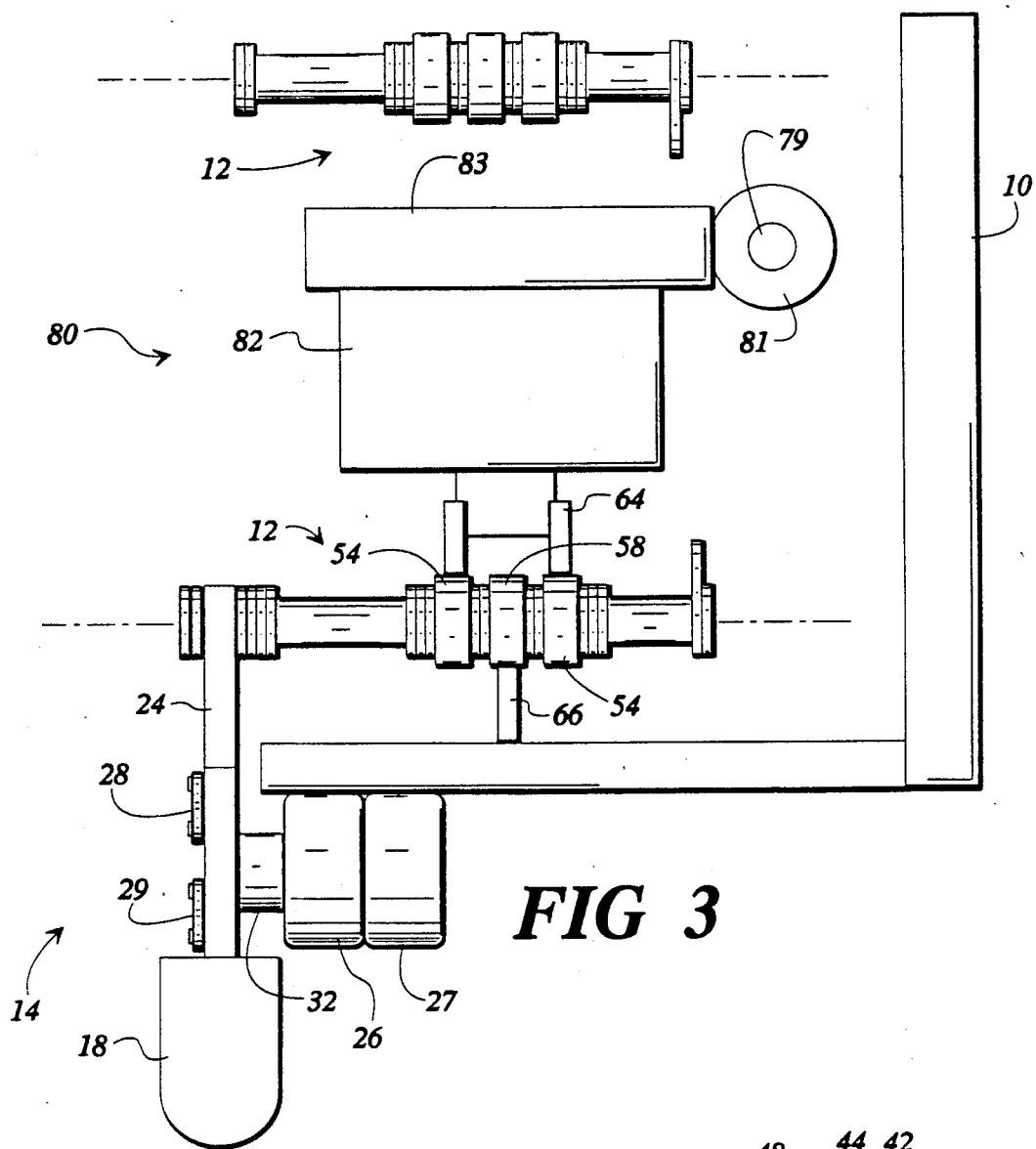
FIG. 3 is an illustrative cross-sectional view of a portion of the apparatus, illustrating the chain in cross section having a divider assembly thereon and moving away from the viewer, being operated in conjunction with a helical gear assembly for deflecting portions of the chain along a portion of its length.

Referring now also to FIGS. 2 and 3, the divider assemblies 14 each include a finger 18 configured to slip in between crackers 20 (see only FIG. 2) in order to define separate slugs 22 of crackers. It should be understood that the crackers may not be stacked straight up as shown in FIG. 2, but may also "lean" slightly backward or forward.

Figure 9:
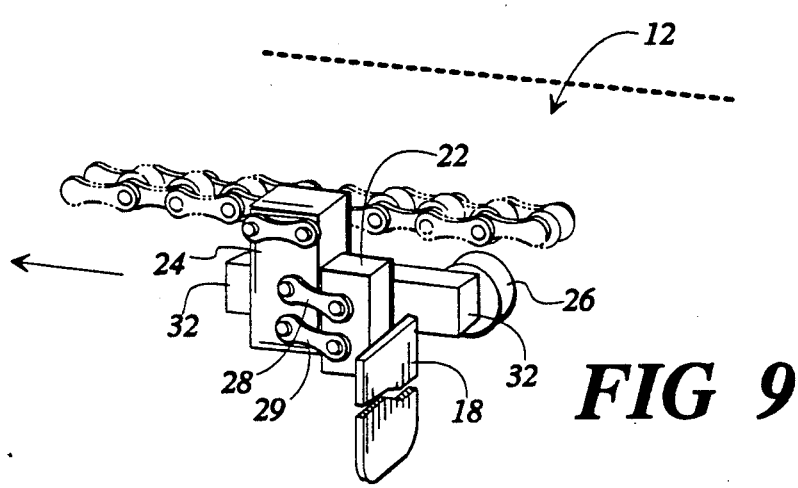
FIG. 9 is a pictorial view illustrating the attachment of the divider assembly shown in FIG. 8 to a portion of the chain shown in phantom.

Referring now to FIG. 9, the divider assemblies 14 each include a articulating block 22, a base block 24, and a pair of guide rollers 26, only one of which is shown in FIG. 9. A pair of linkages 28, 29 connect the articulating block 22 to the base block 24, and allow the articulating block 22 to articulate, due to the movement of the linkages, relative to the base block 24. The trailing guide roller 26 shown is rotatably attached to the trailing end of a guide roller mounting bar 32, which is itself rigidly mounted to the base block 24. The "leading" guide roller not shown in FIG. 9 is rotatably attached to the trailing end of a guide roller mounting bar 32. In temporary reference to FIG. 3, it may be seen that the leading guide roller 27 is rotatably mounted relative to the guide roller mounting bar 32, such that the leading guide roller extends away from the mounting bar farther than does the trailing roller, the extra distance being at least the width of the trailing roller.

Chain Configuration

Figure 4:
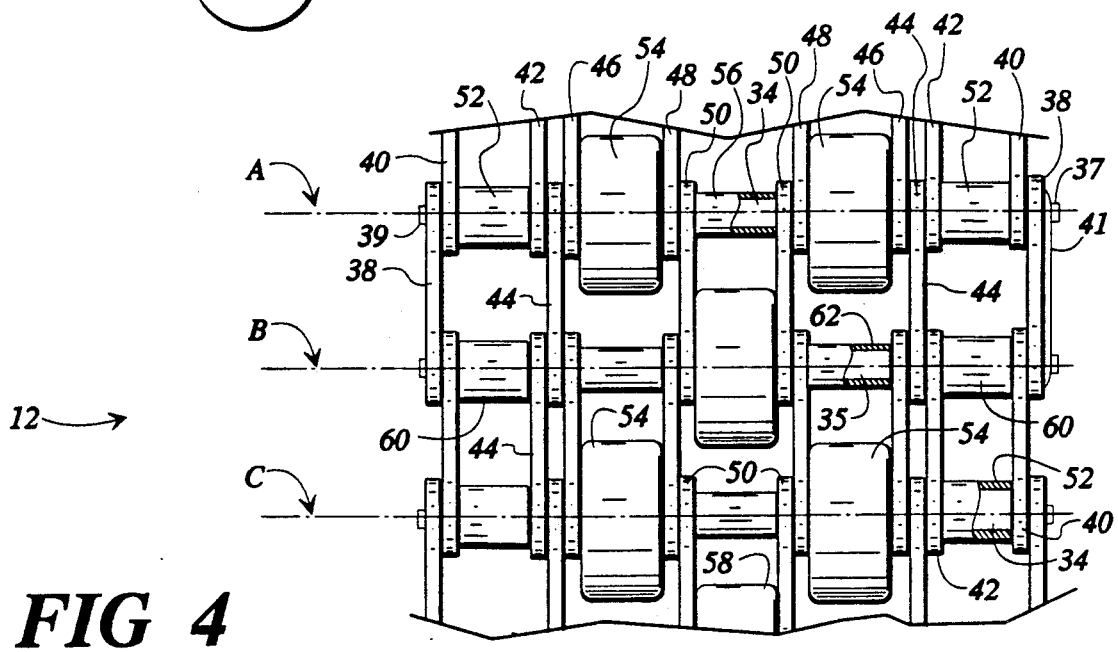
FIG. 4 is a top plan view of a typical portion of the roller chain.
Figure 5:
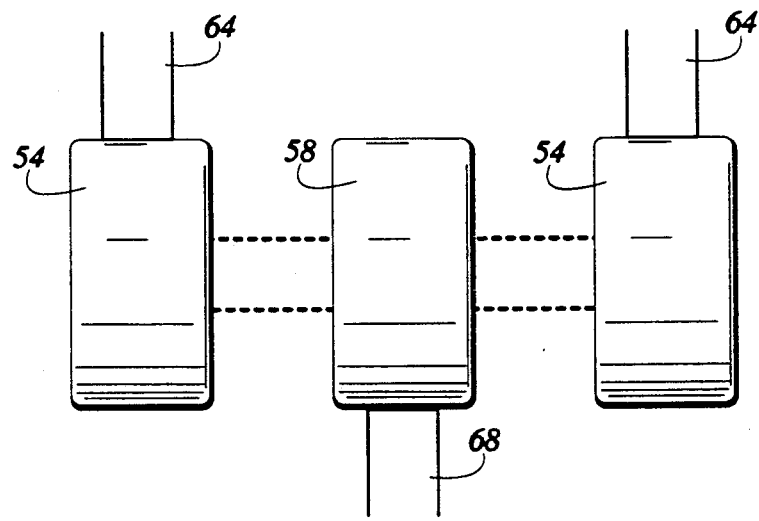
FIG. 5 is an illustrative view illustrating the cooperation between upper slide bars, the lower slide bar, the outer rollers, and the inner rollers.

Referring now only to FIG. 4, a section of the chain 12 is illustrated. It may be understood that the chain 12 is assembled such that, with certain exceptions, a repeating pattern of elements exists along its length. As may be seen, three pivoting axes A, B, C, are shown, which are the longitudinal axes of typical sequentially-positioned pins 34, 35, and, 34', respectively. Referring to pin 34, it may be seen that pin 34 has pivotably mounted thereon about its longitudinal axis A a pair of outer linkages 38, a pair of first interior linkages 40, a pair of second interior linkages 42, a pair of third interior linkages 44, a pair of fourth interior linkages 46, a pair of fifth interior linkages 48, and a pair of innermost linkages 50. Still referring to pin 34, rotatably mounted thereon (about axis A) between adjacent linkages 40, 42 are a pair of sleeves 52. A pair of outer roller bearings (hereinafter rollers) 54 are rotatably mounted to end length sections of pin 34 about axis A between adjacent linkages 46, 48. A center sleeve 56 is rotatably mounted between linkages 50 to pin 34 about axis A.

The pin 34 has a head 39 on one end, and a notched tip 37 at its other end. A clip 41 is releasably attached to the tip 37 to combine with head 39 to maintain the above elements mounted thereon.

Referring now to pin 35, it may be seen that this pin shares various linkages with shaft 34, (38, 44, 50), and shares clip 41, but does not share linkages 40, 42, 46, and 48. Furthermore, pin 35 does not support any outer rollers 54, but along its intermediate length section supports a single center roller 58, which is similar in shape and operation as the outer rollers 54. Besides the linkages and rollers, pin 35 has rotatably mounted thereon a pair of outer sleeves 60 between adjacent linkages 40, 42, and a pair of inner sleeves 62 between adjacent linkages 46, 48. All elements attached to pin 35 may rotate or pivot about axis B.

Referring now to pin 34', it should be understood that this pin has mounted thereon the same type of elements previously discussed with respect to elements mounted upon pin 34, with such elements rotating or pivoting about its longitudinal axis C. Thus, the repeating nature of the roller chain may be understood, although certain exceptions to the repetition will be discussed in detail further in this description.

Adjustability Feature

Referring now to FIGS. 3, 5, 6, and 7, the manner in which the distances between particular pins in the chain may be adjusted is now discussed.

A pair of upper slide bars 64 are positioned along a portion of the chain path such that the lower surface portion 65 of each of the upper slide bars may be in rolling contact with corresponding outer rollers 54. A single lower slide bar 66 defines an upper surface portion 67 configured for roller contact with the center rollers 58. In the preferred embodiment, the upper surface portions 65 are substantially coplanar and coparallel to the lower surface portion 65. The slide bars may also be referred to as "bias bars", or "deflection bars".

Figure 6:
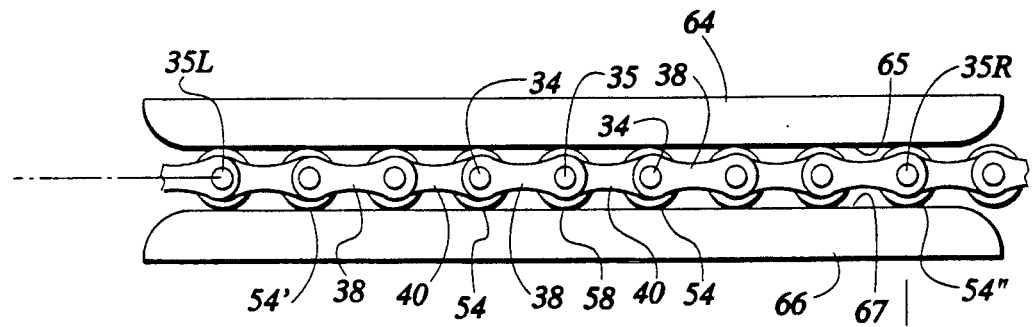
FIG. 6 and 7 illustrate the deflection of a typical chain length by the upper and lower slide bars.
Figure 7:
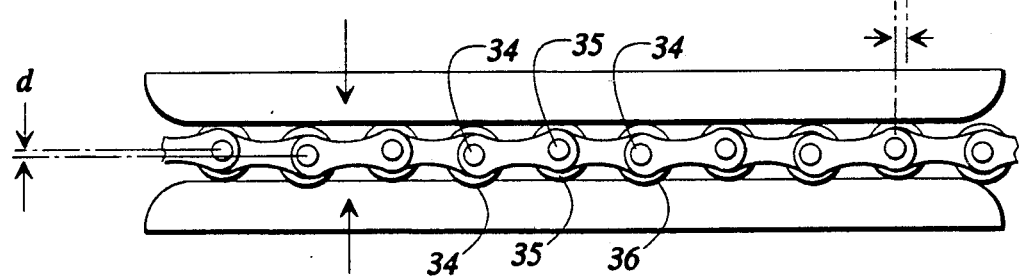

Reference is now made to FIGS. 6 and 7. For purposes of this discussion, the chain portion and its elements intermediate the upper and lower slide bars as shown in FIGS. 6 and 7 may be understood to be in a "deflection zone".

As the roller chain passes between the upper slide bars 64 and the lower slide bar 66, the circumferential surfaces of the outer rollers 54 thereon are preferably in rolling contact with corresponding upper slide bars 64, but not the lower slide bar. At the same time, the circumferential surfaces of the number of center rollers thereon will be in rolling contact with the lower slide bar 66, but not upper slide bars 64. It may be understood that the outer rollers 54 in rolling contact with the upper slide bars 64 are rotating in an opposite direction compared to the rotation of inner rollers 58 in rolling contact with lower slide bar 66.

In the roller chain configuration shown in FIG. 6, the longitudinal axes of the pins 34, 35 supporting rollers 54, 58, respectively, all lie within a substantially common plane which will be referred to as a "first pin plane". When the upper slide bars 64 are moved downwardly relative to the lower slide bar 66 toward the configuration shown in FIG. 7, it may be seen that the outer rollers 54 are likewise urged downwardly, likewise urging their corresponding pins 34 downwardly. However, the center rollers 58 rolling along the lower slide bar 66, as well as their supporting pins 35, do not move downwardly due to the stationary nature of lower slide bar 66, although the rollers 58 may roll along the length of the lower slide bar 66.

As the upper slide bars 64 are moved downwardly, the chain portion between the slide bars is transformed into the configuration as shown in FIG. 7, with adjacent linkages intermediate the pins 34, 35 being pivoted somewhat compared to the configuration shown in FIG. 6.

It may be understood that in the configuration shown in FIG. 7, the longitudinal axes of the pins 35 remain in the "first pin plane". The longitudinal axes of the pins 34 are likewise substantially in a common "second pin plane" spaced apart from but substantially parallel to the "first pin plane". It may be understood that the distance "d" between these two pin planes is substantially the same distance that the upper slide bars 64 were moved from that shown from FIG. 6 to FIG. 7.

As discussed above, the linkages intermediate the pins 34, 35 (adjacent linkages) are pivoted relative to each other in FIG. 7 in comparison to FIG. 6. Therefore, it may be understood that the distance between the longitudinal axes of pins 35L and 35R is greater than the same axes when in the configuration shown in FIG. 7. It may further be understood that the spaced apart distance between pins 35 (as well as their longitudinal axes) in the deflection zone in FIG. 6 is greater than that shown in FIG. 7, due to the differing spaced-apart relationship of the upper and lower slide bars.

As discussed later in this application, divider assemblies are attached relative to pins 35, and move along with these pins. Therefore, it can be understood that as the distance between pins 35 may be adjusted when in the deflection zone due to the relative positioning of the slide bars, so can the distance between the divider assemblies be adjusted. Therefore, it may be understood that by selectively adjusting the relative positioning of the slide bars, the relative positioning of the separation assemblies, at least while in the defection zone, may be adjusted.

Referring now FIG. 3, one of two substantially similar helical adjustment assemblies 80 are shown. Each of the two helical gear assemblies 80 includes a body 82 rigidly attached relative to the frame 10 of the apparatus, and includes a helical gear 83 and a plunger 84. Each of the substantially similar plungers 84 of the helical gear assemblies 80 is rigidly attached to one end of each of the upper slide bars 64; the leading helical gear assembly's plunger 84 is attached to the leading end of each of the upper slide bars 64, and the trailing helical gear assembly's plunger 84 is attached to the trailing end of each of the upper slide bars 64.

The helical gear 83 of each helical gear assembly 80 is in toothed engagement with a corresponding one of two substantially similar helical gears 81 commonly mounted to a shaft 79 rotatably mounted along its longitudinal axis relative to the frame 10 by bearings or other means known in the art. The shaft may be rotated manually by a handwheel (not shown) or by other means known in the art.

It may be understood that as the helical gears 81 are commonly affixed to the shaft 79, rotation of the shaft likewise causes similar rotation of the helical gears 81, which likewise causes synchronized rotation of the helical gears 83 of the helical gear assemblies 80. Such synchronized rotation causes synchronized movement of the plungers in upward or downward directions, depending on rotation of the shaft 79. It may be understood that such synchronized movement causes articulated movement of the upper slide bars 64 relative to the lower slide bar 66 rigidly affixed to the frame 10, with the plane of the surface portions 65 of the upper slide bars 64 being substantially parallel to the plane of the 67 surface portion of the lower slide bar 66.

Attachment of Divider Assemblies to Chain

Figure 8:
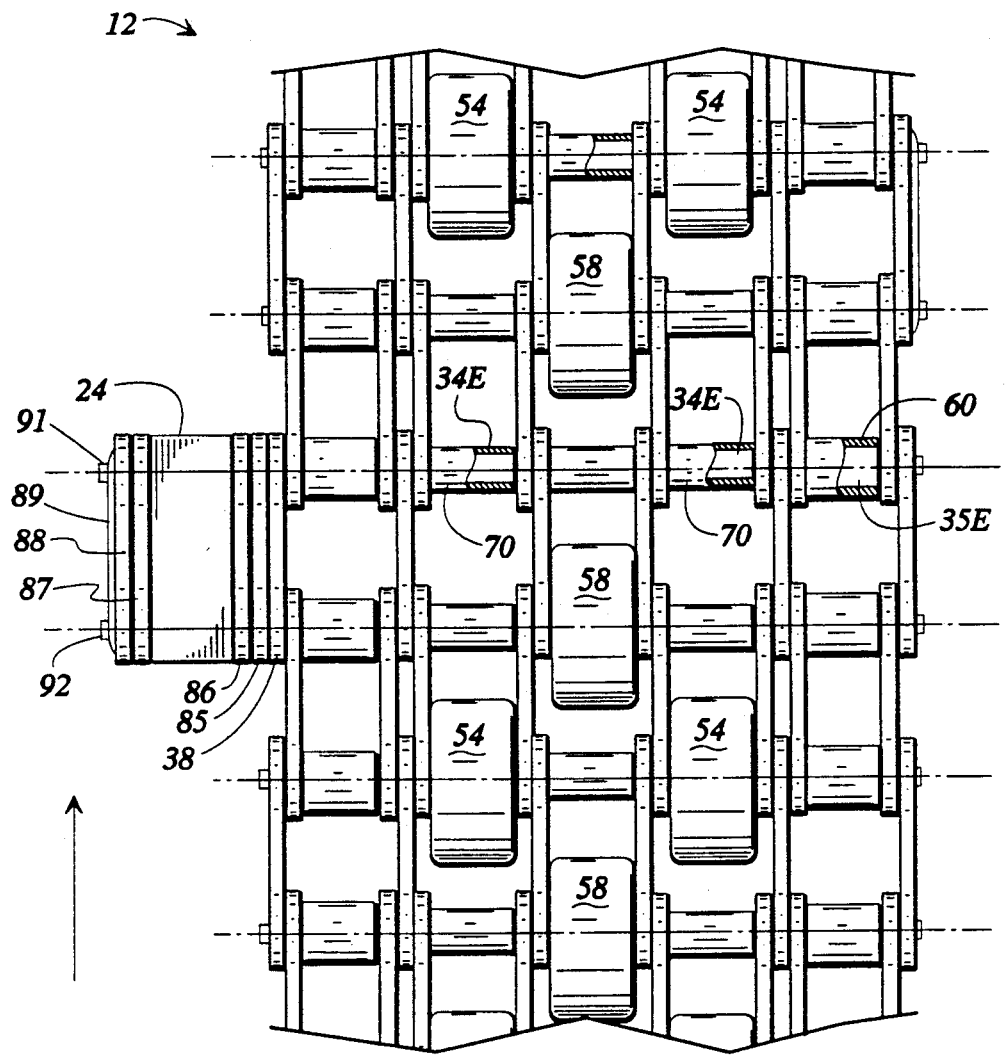
FIG. 8 is a partial top plan view of a portion of the chain illustrating a first type of connection of a divider assembly to the chain.

Referring now to FIGS. 8 and 9, one means of attaching the divider assemblies 14 to the roller chain 12 is shown. As previously discussed, each divider assembly includes a main block 24. As shown in FIG. 8, main block 24 is mounted to adjacent pins 34E, 35E, which are extended versions of pins 34, 35. The remainder of the divider assembly is not shown in FIG. 8, but is shown in FIG. 9.

The longitudinal axes of pins 34E and 35E are substantially parallel. The main block 24 of the divider assembly 14 is attached to adjacent pins 34E, 35E, as they extend not only through the outer linkage 38 adjacent the main block 24, but also through links 85, 86, through main block 24, through links 87, 88, and have their tips 91, 92 captured by a removable clip 89.

It may be seen that the pin 34E does not support a pair of outer rollers 54 as do the other pins 34 shown in FIG. 8, but instead supports a pair of sleeves 70. This is one of the above-discussed exceptions to the chain's repeating configuration. This is due to a desire to allow the longitudinal axes of the pin 34E supporting main block 24 to remain in the same plane as the longitudinal axes of the other pins 35E, 35 supporting center rollers 58 and in contact with the lower slide bar. As the outer rollers 54 are absent, pin 34E supporting the main block 24 will not be pushed down be the upper bars. Therefore it may be understood that the linkages attached to and extending from either side of pin 34E will not "pivot" as discussed in reference to FIGS. 6 and 7. Instead, that two-linkage portion of chain will be fully extended due to the tensile force imparted thereon. As such, the main block 24, and the divider assembly attached thereto, will likewise not pivot.

Figure 10:
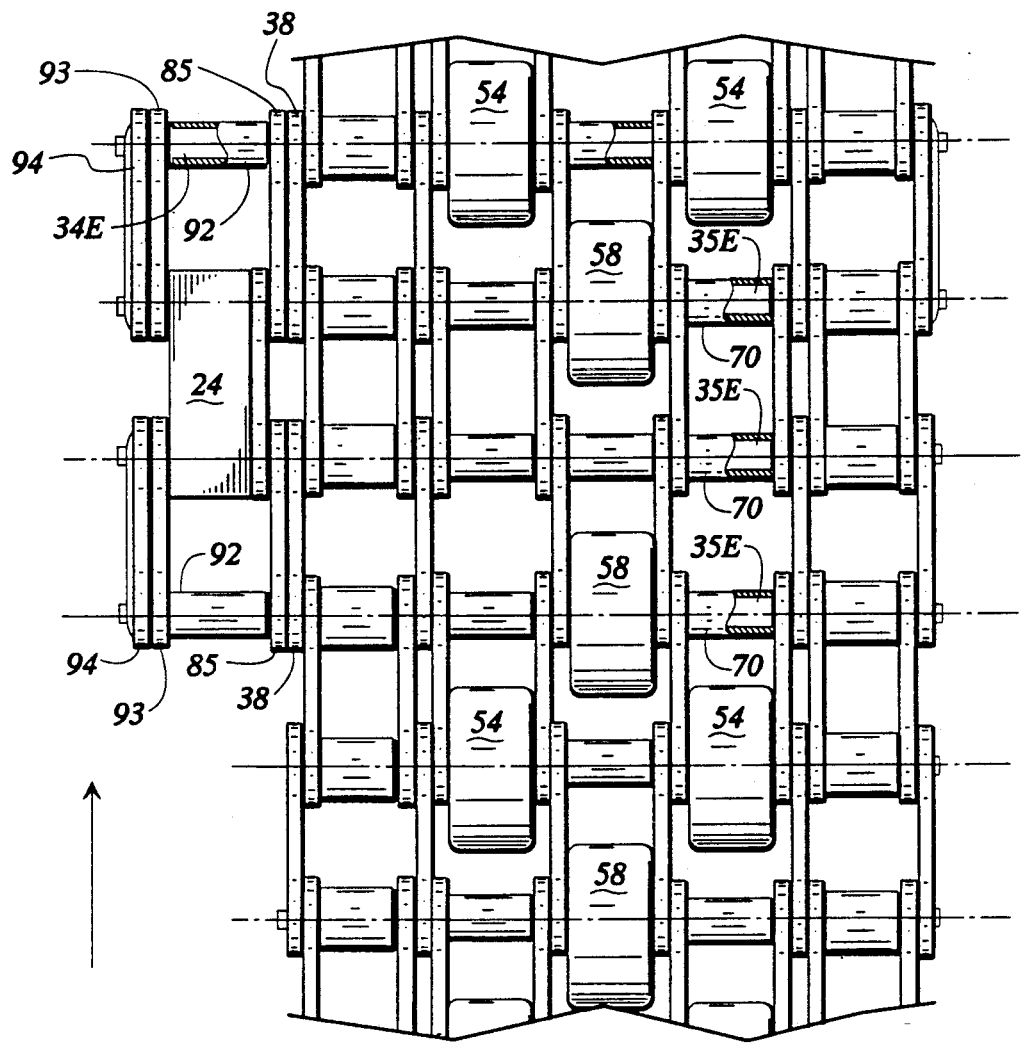
FIG. 10 is a partial top plan view of a portion of the chain illustrating a second type of connection of a divider assembly to the chain.
Figure 11:
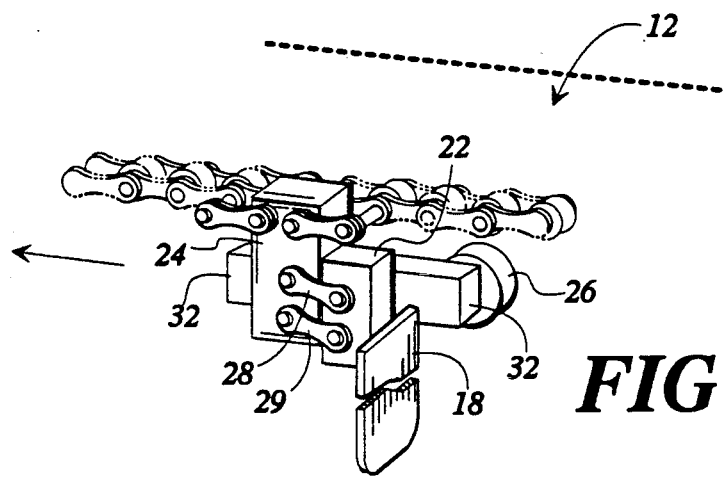
FIG. 11 is a pictorial view illustrating the attachment of the divider assembly shown in FIG. 9 to a portion of the chain shown in phantom.

Referring now to FIGS. 10 and 11, a second means for attaching a divider assembly 14 to a section of the roller chain 12 is shown. In this configuration, outer rollers are not present on trailing pin 34E, instead sleeves 70 are in place.

This configuration differs from that shown in FIGS. 8, 9, in that two pins 34E are shown, in conjunction with two pins 35E. Leading pin 34E has a pair of outer rollers 54 mounted thereupon, and also extends through linkages 38, 85, a first sleeve 92, and first linkages 93, 94, and has its tip captured by a first clip as previously described. Leading pin 35E has a roller 58 mounted thereon, and also extends through linkages 38, 85, first sleeve 92, first linkages 93, 94, and has its tip captured by the first clip. Trailing pin 34E does not have any rollers mounted thereon, but extends through second linkages 38, 85, main block 24, second linkages 93, 94, and has its tip captured by a second clip. Trailing pin 35E has an intermediate roller 58 mounted thereon, and extends through second linkages 38, 85, main block 24, second linkages 93, 94, and has its tip captured by the second clip.

Once again it may be understood that the longitudinal axes of trailing pin 34E and the two pins 35E remain substantially coplanar during their passage through the deflection zone, as the trailing pin 34E is not deflected due to the absence of outer rollers.

As may be understood from the discussion immediately above, unlike pins 34, extended pins 34 E attached to the divider assemblies are not deflected by the upper slide bars 64. Therefore it may be understood that the divider assemblies are not pivoted during the passage of their pins 34E, 35E through the deflection zone.

The Articulated Movement

Referring now to FIG. 9, the articulating nature of the articulating block 22 relative to the base block 24 is discussed. As may be seen also in reference to FIG. 2, the fingers 18 are periodically inserted into the path of travel of the crackers. It may be understood that at times the finger will be inserted cleanly between a pair of crackers, and minimal potential of cracker damage occurs. However, occasionally the lower edge of the finger 18 may not fit cleanly between a pair of crackers, but may instead tend to rest atop a particular cracker. If this occurs, the finger will tend to articulate upwardly due to the linkages of 28,29, relative to the main block 24 and will thus be somewhat retarded relative to the travel of the crackers. As the crackers will be traveling within a vibrating chute (See FIG. 2) driven by a vibrator such as that shown in U.S. Pat. No. 3,786,912, preferably the finger will make its way on one side or the other of the cracker. It may be understood that had the articulating configuration not been in place, the vibrating action of the chutes would not have as much of an opportunity to allow the finger 18 to make its way to one side of the cracker. Furthermore, the cracker could have been damaged. The embodiment shown in FIG. 11 also illustrates a articulating block 22 operating as described above.

Operation and Adjustment

Figure 12:
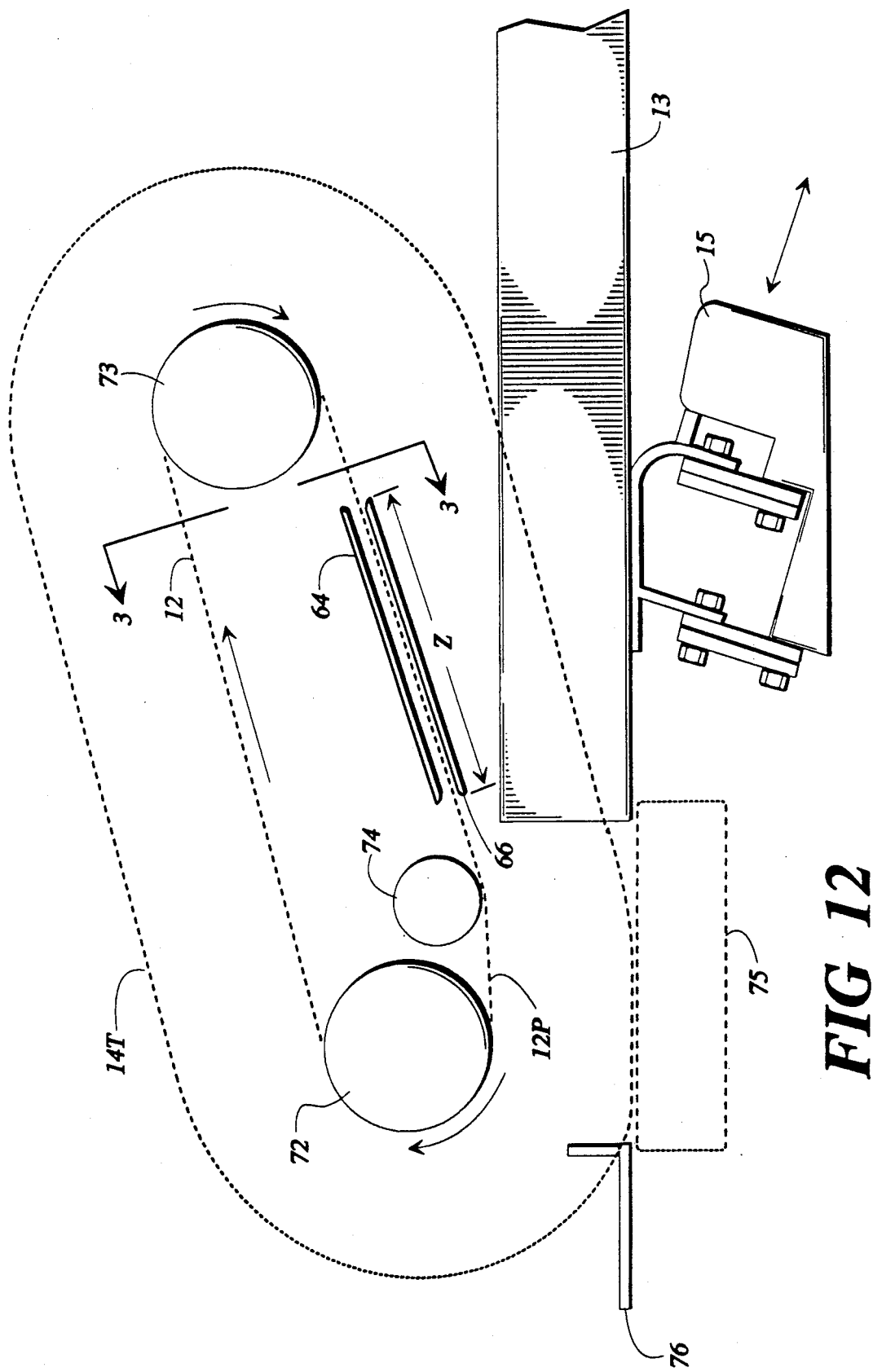
FIG. 12 is an illustrative side plan view illustrating the path of the divider assemblies in relation to the path of the crackers.

Referring now to FIG. 12, the chain 12 loop (designated generally as passing along path 12P in FIG. 13) is driven by a drive sprocket cluster 72 positioned downstream (relative to the cracker path) of the deflection zone "Z" and rotatably mounted relative to the frame. The drive sprocket cluster 72 may be continuously or intermittently driven, depending on how the crackers are to be handled after division into slugs. In the embodiment shown in FIG. 12, the drive sprocket cluster is intermittently driven, such that the slugs may be inserted into a cross conveyor 75, which is itself intermittently driven in synchronization with the chain 12.

The chain 12 passes from the drive sprocket cluster 72 to a take-up sprocket cluster 73, which is mounted about a shaft which is itself rotatably mounted in a spring-loaded nature relative to the frame of the apparatus supporting the chain loop. The chain then passes from the take-up sprocket cluster 73 to a fixed sprocket cluster 74, and subsequently to the drive sprocket cluster 72, thus completing the chain loop.

The take-up sprocket cluster 73 is desirable due to the fact that the distances between various chain pins may be lengthened or shortened as discussed above. It may be understood that the take-up sprocket cluster 73 is spring loaded along a path which is substantially parallel to the path of the chain path intermediate the take-up sprocket cluster 73 and the fixed sprocket cluster 74.

All of the above sprocket clusters, in the preferred embodiment, include a pair of similar sprockets affixed to a common shaft. Each sprocket engages and drives the outermost sleeves (52,60, see FIG. 4) in the chain 12.

As described above, a plurality of divider assemblies 14 are attached to the chain loop in a spaced-apart configuration. Dotted path 14T designates the path of the extreme tips of the fingers during their orbital travel along with the divider assemblies. It may be understood that the divider assemblies are preferably attached to pins which are not deflected by the upper slide bars 64 during their passage through the deflection zone. However, it should be understood that the spaced-apart positioning of the divider assemblies is preferably set when its supporting pins pass through the deflection zone. Therefore, it should be understood that the tips of the fingers, when intersecting the cracker path as shown in FIG. 12, are preferably in a set, spaced-apart configuration due to the relative, set, positioning of the divider assemblies when their supporting pins pass through the deflection zone.

As the fingers of the divider assemblies intersect the crackers while in the deflection zone, it may be understood the adjustment of the relative positioning of the slide bars, even by trial and error, enhances uniform separation by the finger of the series of shingle-stacked crackers into slugs.

It should be understood that adjustment is preferably not a continuous, ongoing process, instead is it preferable that the adjustment only be occasionally performed when found necessary due to inconsistencies in the cookies passing thereby or due to changes in the average cracker thickness. However, it may generally be understood that the chain typically enters the deflection zone in a fully-extended configuration due to the chain being in a tensile state. However, upon entering the deflection zone, the chain may be deflected as described above such that adjacent linkages along the length of the chain are pivoted in opposite directions, thus shortening the distance between the rotational axes of rollers 54, as well as rollers 56.

Alternative Embodiments

It may be understood that various alternate embodiments are contemplated without departing from the spirit and scope of the present invention. For example, non-rotating rigid bearings could be used in place of the above-described roller bearings. Furthermore, instead of the pair of upper slide bars, a single bias element could be used which could have a central slot milled out to provide passage of the centrally-positioned roller.

What is claimed is:

1. An apparatus for intersecting a series of aligned elements configured to pass along an element path, comprising:
   a pair of dividing means configured to intersect said aligned elements;
   a chain supporting said pair of dividing means in a spaced-apart manner, a portion of said chain intermediate said divider means itself comprising:
     first, second, third, and fourth pins sequentially positioned along the portion of said chain and having spaced-apart longitudinal axes;
     first, second, third, and fourth bearings mounted to corresponding of said first, second, third, and fourth pins;
     a first elongate linkage having its ends pivotably mounted to said first and second pins, respectively, such that said longitudinal axes of said first and second pins are maintained in a substantially parallel relationship;
     a second elongate linkage having its ends pivotably mounted to said second and third pins, respectively, such that said longitudinal axes of said second and third pins are maintained in a substantially parallel relationship; and
     a third elongate linkage having its ends pivotably mounted to said third and fourth pins, respectively, such that said longitudinal axes of said third and fourth pins are maintained in a substantially parallel relationship;
   drive means for urging said chain along a path;
   a first deflection member positioned adjacent said path of said chain section to urge said first and third bearings in a first direction substantially perpendicular to said path such that the longitudinal axes of said first and third pins are in a first pin plane;
   a second deflection member positioned adjacent said path of said chain section to urge said second and forth bearings in a second direction substantially opposite to said first direction such that the longitudinal axes of said second and fourth pins are in a second pin plane substantially parallel to said first pin plane; and
   adjustment means for adjusting the position of said second deflection member relative to that of said first deflection member such that the separation of said substantially parallel first and second pin planes may be varied,
   whereby adjustment of the separation of said first and second pin planes causes the spaced-apart distance of said first and third pins to be varied due to the relative pivoting of the interconnecting linkages.

2. The apparatus as claimed in claim 1, wherein said adjustment means is configured to allow said first and second pin planes to be substantially common.

3. The apparatus as claimed in claim 2, wherein said bearings on each of said pins are roller bearings rotatably mounted on said pins about each of their longitudinal axes.

4. The apparatus as claimed in claim 3, wherein said chain length further comprises a fifth pin and a fourth elongate linkage having its ends pivotably mounted to said fourth and fifth pins, respectively, such that said longitudinal axes of said fourth and fifth pins are maintained in a substantially parallel relationship, and wherein said fifth pin is not deflected by said first deflection member, but remains in said first pin plane.

5. The apparatus as claimed in claim 2, wherein said chain length further comprises a fifth pin and a fourth elongate linkage having its ends pivotably mounted to said fourth and fifth pins, respectively, such that said longitudinal axes of said fourth and fifth pins are maintained in a substantially parallel relationship, and wherein said fifth pin is not deflected by said first deflection member, but remains in said first pin plane.

6. The apparatus as claimed in claim 1, wherein said bearings on each of said pins are roller bearings rotatably mounted on said pins about each of their longitudinal axes.

7. The apparatus as claimed in claim 6, wherein said chain length further comprises a fifth pin and a fourth elongate linkage having its ends pivotably mounted to said fourth and fifth pins, respectively, such that said longitudinal axes of said fourth and fifth pins are maintained in a substantially parallel relationship, and wherein said fifth pin is not deflected by said first deflection member, but remains in said first pin plane.

8. An apparatus for intersecting a series of aligned elements configured to pass along an element path, comprising:
   a length of chain itself comprising:
     first, second, third, fourth, and fifth pins sequentially positioned along the length of said chain and having spaced-apart longitudinal axes;
     first, second, third, and fourth bearings mounted to corresponding of said first, second, third, and fifth pins about their longitudinal axes;
     a first elongate linkage having its ends pivotably mounted to said first and second pins, respectively, such that said longitudinal axes of said first and second pins are maintained in a substantially parallel relationship;
     a second elongate linkage having its ends pivotably mounted to said second and third pins, respectively, such that said longitudinal axes of said second and third pins are maintained in a substantially parallel relationship;
     a third elongate linkage having its ends pivotably mounted to said third and fourth pins, respectively, such that said longitudinal axes of said third and fourth pins are maintained in a substantially parallel relationship; and
     a fourth elongate linkage having its ends pivotably mounted to said fourth and fifth pins, respectively, such that said longitudinal axes of said fourth and fifth pins are maintained in a substantially parallel relationship;
   drive means for drawing said chain length along a path such that said chain length is in a tensile state while in said path;

a first deflection member positioned adjacent said path of said chain section to urge said first and third bearings in a first direction substantially perpendicular to said path such that the longitudinal axes of said first and third pins are in a first pin plane;

a second deflection member positioned adjacent said path of said chain section to urge said second and fourth bearings in a second direction substantially opposite to said first direction such that the longitudinal axes of said second and fourth pins are in a second pin plane substantially parallel to said first pin plane;

means for maintaining said longitudinal axis of said fifth pin substantially in said first pin plane;

dividing means attached to said fourth and fifth pins, said dividing means having an intersecting finger and configured to be drawn along with said chain length such that said finger intersects said element path when said second deflection member is urging said second and fourth rollers; and adjustment means for adjusting the position of said second deflection member relative to that of said first deflection member such that the separation of said substantially parallel first and second planes may be varied, whereby adjustment of the separation of said first and second pin planes causes the spaced-apart distance of said first and third pins to be varied due to the relative pivoting of the interconnecting linkages, without pivoting of the dividing means.

9. The apparatus as claimed in claim 8, wherein said bearings on each of said pins are roller bearings rotatably mounted on said pins about each of their longitudinal axes.

10. The apparatus as claimed in claim 9, wherein said dividing means comprises:

a body attached to said fourth and fifth pins; and a finger attached to said body in an articulating manner, such that said finger may articulate upon abutting an element when intersecting said element path.

11. The apparatus as claimed in claim 10, wherein said adjustment means is configured to allow said first and second pin planes to be substantially common.

12. The apparatus as claimed in claim 8, wherein said dividing means comprises:

a body attached to said fourth and fifth pins; and a finger attached to said body in an articulating manner, such that said finger may articulate relative to said body upon abutting an element when intersecting said element path.

13. The apparatus as claimed in claim 12, wherein said adjustment means is configured to allow said first and second pin planes to be substantially common.

14. The apparatus as claimed in claim 8, wherein said adjustment means is configured to allow said first and second pin planes to be substantially common.

15. An apparatus for intersecting a series of aligned elements configured to pass along an element path, comprising:

a pair of dividing means configured to intersect said aligned elements;

a chain supporting said pair of dividing means in a spaced-apart manner, a portion of said chain intermediate said divider means having a length and a width, said portion itself comprising:

first, second, third, and fourth pins sequentially positioned along the length of said chain portion and having spaced-apart longitudinal axes, each of said pins having two opposing ends, two end length sections extending from said ends, and an intermediate length section intermediate said end length sections;

a first linkage having its ends pivotably mounted to said first and second pins, respectively;

a second linkage having its ends pivotably mounted to said second and third pins, respectively, such that said longitudinal axes of said second and third pins are maintained in a substantially parallel relationship;

a third linkage having its ends pivotably mounted to said third and fourth pins, respectively, such that said longitudinal axes of said third and fourth pins are maintained in a substantially parallel relationship;

a pair of spaced-apart first bearing members mounted to said first pin, each of said first bearing members mounted to a corresponding one of said end length sections of said first pin;

a second bearing member mounted to said second pin, said second bearing mounted to said intermediate length section of said first pin;

a pair of spaced-apart third bearing members mounted to said third pin, each of said third bearings mounted to a corresponding one of said end length sections of said third pin;

a fourth bearing member mounted to said fourth pin, said fourth bearing mounted to said intermediate length section of said fourth pin;

drive means for urging said chain along a path;

a pair of first deflection members positioned adjacent said path of said chain section to urge said first and third bearing member pairs in a first direction substantially perpendicular to said path such that the longitudinal axes of said first and third pins are in a first pin plane;

a second deflection member positioned adjacent said path of said chain section to urge said second and fourth bearing members in a second direction substantially opposite to said first direction such that the longitudinal axes of said second and fourth pins are in a second pin plane substantially parallel to said first pin plane; and adjustment means for adjusting the position of said second deflection member relative to that of said first deflection members such that the separation of said substantially parallel first and second pin planes may be varied, whereby adjustment of the separation of said first and second pin planes causes the spaced-apart distance of said first and third pins to be varied due to the relative pivoting of the interconnecting linkages.

16. The apparatus as claimed in claim 15, wherein said adjustment means is configured to allow said first and second pin planes to be substantially common.

17. The apparatus as claimed in claim 16, wherein said bearing members on each of said pins are roller bearings rotatably mounted on said pins about each of their longitudinal axes.

18. The apparatus as claimed in claim 15, wherein said bearing members on each of said pins are roller bearings rotatably mounted on said pins about each of their longitudinal axes.

* * * * *